(12) United States Patent
Singh et al.

(10) Patent No.: US 11,120,073 B2
(45) Date of Patent: Sep. 14, 2021

(54) GENERATING METADATA FOR IMAGE-BASED QUERYING

(71) Applicant: International Business Machines Corporation, Armonk, NY (US)

(72) Inventors: Raghavendra Singh, New Delhi (IN); Sachindra Joshi, New Delhi (IN); Vikas C. Raykar, Bangalore (IN); Ayushi Dalmia, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 16/511,590

(22) Filed: Jul. 15, 2019

(65) Prior Publication Data
US 2021/0019343 A1 Jan. 21, 2021

(51) Int. Cl.
*G06F 16/532* (2019.01)
*G06N 3/04* (2006.01)
*G06K 9/62* (2006.01)
*G06F 16/538* (2019.01)
*G06F 16/58* (2019.01)

(52) U.S. Cl.
CPC ............ *G06F 16/58* (2019.01); *G06F 16/532* (2019.01); *G06F 16/538* (2019.01); *G06K 9/6276* (2013.01); *G06N 3/04* (2013.01)

(58) Field of Classification Search
None
See application file for complete search history.

(56) References Cited

U.S. PATENT DOCUMENTS

| | | | |
|---|---|---|---|
| 9,053,115 B1 | 6/2015 | Rosenberg et al. | |
| 9,082,162 B2 | 7/2015 | Gokturk et al. | |
| 9,582,735 B2 | 2/2017 | Dube et al. | |
| 2010/0205202 A1 | 8/2010 | Yang et al. | |
| 2014/0075393 A1 | 3/2014 | Mei et al. | |
| 2015/0356199 A1* | 12/2015 | Mei | G06F 16/9535 707/728 |
| 2016/0196350 A1 | 7/2016 | Mau | |
| 2016/0350336 A1* | 12/2016 | Checka | G06K 9/4628 |
| 2017/0097948 A1 | 4/2017 | Kerr et al. | |
| 2017/0236032 A1 | 8/2017 | Lin et al. | |
| 2017/0357878 A1* | 12/2017 | Sawhney | G06K 9/00684 |

(Continued)

OTHER PUBLICATIONS

Zha et al., Visual Query Suggestion, MM'09, Oct. 19-24, 2009.

*Primary Examiner* — Idowu O Osifade
(74) *Attorney, Agent, or Firm* — Ryan, Mason & Lewis, LLP

(57) ABSTRACT

Methods, systems, and computer program products for generating metadata for image-based querying are provided herein. A computer-implemented method includes processing a query image against a database by applying a deep learning visual model to the query image and images contained within the database; retrieving a set of multiple images from the database based on the processing; identifying subsets of images among the set of multiple images by analyzing metadata attribute values of the set of multiple images and nearest neighbor distance values between the query image and the multiple images in the set; determining one or more items of metadata attributable to the query image by processing metadata of the subsets of images; and outputting, to a user, the items of metadata in response to the query image.

20 Claims, 6 Drawing Sheets

(56) References Cited

U.S. PATENT DOCUMENTS

| | | | |
|---|---|---|---|
| 2018/0373955 A1* | 12/2018 | Soldevila | G06F 16/532 |
| 2019/0236167 A1* | 8/2019 | Hu | G06K 9/6274 |
| 2019/0318405 A1* | 10/2019 | Hu | G06N 20/00 |
| 2020/0143193 A1* | 5/2020 | Najibikohnehshahri | G06T 7/194 |
| 2020/0210763 A1* | 7/2020 | Lin | G06K 9/4628 |
| 2020/0380403 A1* | 12/2020 | Aggarwal | G06K 9/6215 |

* cited by examiner

GENERATING METADATA FOR IMAGE-BASED QUERYING

FIELD

The present application generally relates to information technology and, more particularly, to image processing techniques.

BACKGROUND

Commonly, e-commerce catalogs contain product images and associated textual descriptions for each product. Querying such catalogs with text tags is common, but often does not capture the visual description of the product that a querying user envisions. Additionally, text-based queries are often driven by a corresponding database, either in the form of an exposed taxonomy or via suggested terms that match the text query. Conventional image-based querying techniques are not that prevalent and face numerous challenges. For example, query images may not be derived from a relevant database, and image queries may contain images with multiple objects of interest (leading to lack of clarity in conventional approaches with respect to which part(s) of the image is the focus of the user's query). Additionally, in such conventional approaches, images are often weakly-labeled, and accordingly, learning jointly with text descriptions is challenging.

SUMMARY

In one embodiment of the present invention, techniques for generating metadata for image-based querying are provided. An exemplary computer-implemented method can include processing a query image against one or more databases by applying a deep learning visual model to (i) the query image and (ii) images contained within the one or more databases, and retrieving a set of multiple images from the one or more databases based at least in part on the processing. The method also includes identifying one or more subsets of images among the set of multiple images by analyzing (i) one or more metadata attribute values of the set of multiple images and (ii) nearest neighbor distance values between the query image and the multiple images in the set. Further, the method includes determining one or more items of metadata attributable to the query image by processing metadata of the one or more subsets of images, and outputting, to at least one user, the one or more items of metadata in response to the query image.

In another embodiment of the invention, an exemplary computer-implemented method can include processing multiple portions of a query image against one or more databases by applying a deep learning visual model to (i) the multiple portions of the query image and (ii) multiple portions of images contained within the one or more databases. Such a method also includes retrieving a set of multiple images from the one or more databases based at least in part on the processing, and identifying, for each of the multiple portions of the query image, one or more subsets of images among the set of multiple images by analyzing (i) one or more metadata attribute values of the multiple portions of the set of multiple images and (ii) nearest neighbor distance values between the given portion of the query image and the multiple portions of the multiple images in the set. Additionally, such a method includes generating a final subset of images by (i) removing one or more outlier subsets from the identified subsets and (ii) combining the remaining subsets into the final subset of images, determining one or more items of metadata attributable to the query image by processing metadata of the images within the final subset, and outputting, to at least one user, the one or more items of metadata in response to the query image.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes predicting metadata using visual querying, text similarity and smooth result sets. At least one embodiment includes determining metadata for a query image (e.g., a product image) in the form of a textual description from a catalog of products, wherein the catalog of products contains products with images and metadata associated with the products. Such an embodiment includes extracting features from catalog images using a pre-trained deep learning visual model, and building efficient nearest neighbor indices on the catalog images using the extracted features. Additionally, such an embodiment also includes extracting one or more features for a query image using the same deep learning visual model and retrieving a set of one or more similar images (i.e., similar to the query image) using the nearest neighbor indices. Further, such an embodiment includes determining and/or identifying smooth subsets of the retrieved set of similar images and utilizing metadata attributes of the retrieved images to identify one or more of the images having low variation in metadata values.

In accordance with one or more embodiments, a visual search system retrieves the closest neighbors from a set of catalog images for a given query image. Determining which nearest neighbors (from a retrieved set) to present to the user can depend, for example, on the coverage of the catalog as well as the complexity of the query image. Accordingly, in certain implementations, relying on the entire result set for the metadata of the query image may be disadvantageous. To improve the precision of search attributes, at least one embodiment includes defining a "smooth" set (or subset), which refers to a subset of the retrieved results having a uniform attribute value for any given attribute. By way merely of example, if a user queries for a t-shirt and the results retrieved from the catalog contain sweaters, blouses, and t-shirts, one or more embodiments can include smoothing by attribute category, which would result in selecting only the subset of the results containing t-shirt as the category value.

Figure 1:
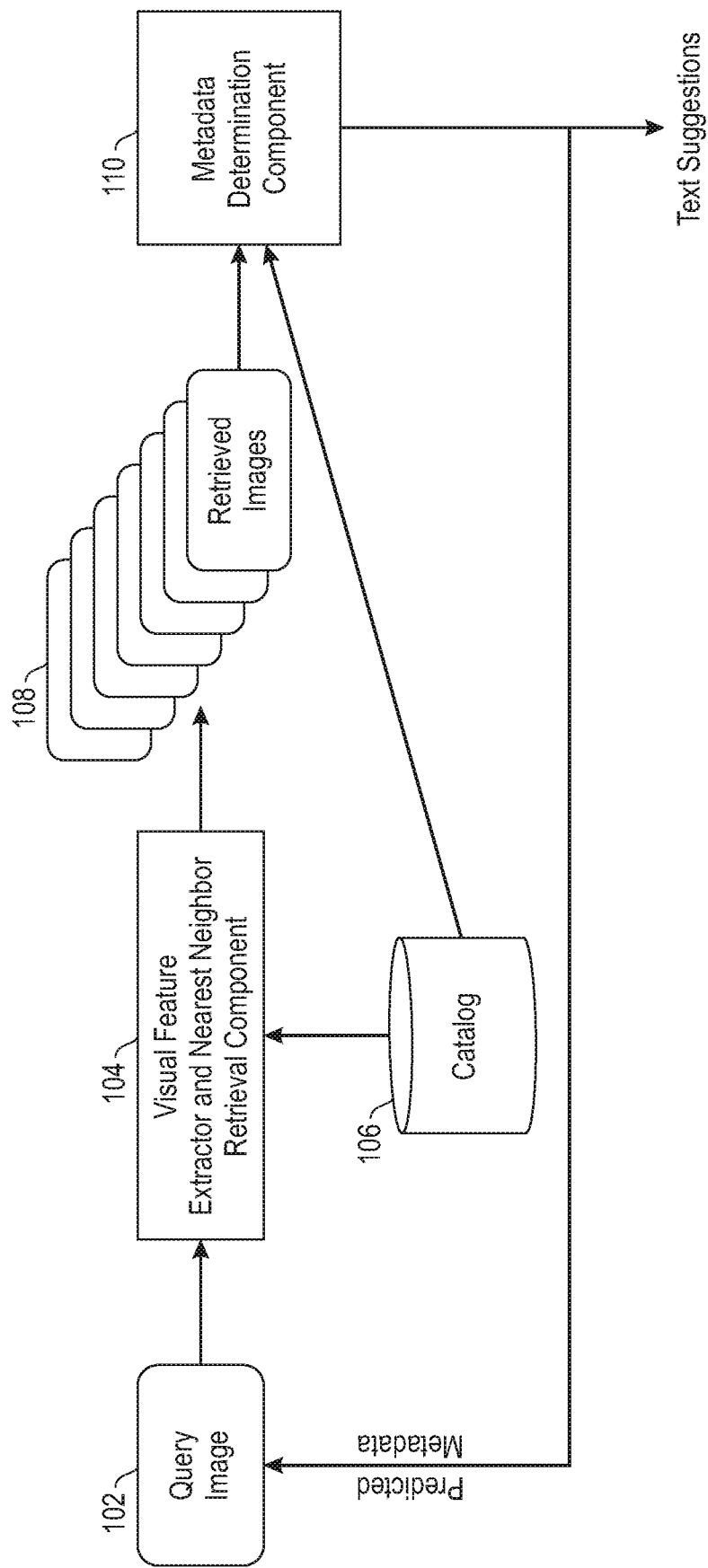
FIG. 1 is a diagram illustrating system architecture, according to an exemplary embodiment of the invention.

FIG. 1 is a diagram illustrating system architecture, according to an embodiment of the invention. By way of illustration, FIG. 1 depicts a query image 102, which is processed by a visual feature extractor and nearest neighbor retrieval component 104. As illustrated in FIG. 1, the visual feature extractor and nearest neighbor retrieval component 104 receives input from a catalog database 106 (which contains product images and text-based descriptions thereof). Based on such processing, the visual feature extractor and nearest neighbor retrieval component 104 retrieves multiple images 108 (from the catalog database 106), and provides the retrieved images 108 to a metadata determination component 110. The meta-data determination component 110, in one or more embodiments, works on a given set of images along with the corresponding metadata to determine the representative metadata attribute value for a given set of attributes. Depending on the attribute type, at least one embodiment includes computing the representative metadata by performing majority voting. An alternative example embodiment can include performing one or more statistical operations on the attribute values for the set of images.

As depicted in FIG. 1, the metadata determination component 110, based at least in part on analysis of the retrieved images 108 and input from the catalog database 106, generates one or more text suggestions for the query image, from which metadata can be predicted and associated with the query image 102.

In at least one embodiment, the visual feature extractor and nearest neighbor retrieval component 104 generates a smoothed subset of a result set (that is, retrieved images 108 as a smoothed subset of the images contained within catalog database 106). Such a smoothed subset includes less variation with respect to one or more metadata attributes. For example, all members of the subset can have similar colors and/or textures, all members of the subset can have the same collar type, all members of the subset are close to each other (via embedding distance), etc. Accordingly, the visual feature extractor and nearest neighbor (NN) retrieval component 104 can remove outliers from the set of analyzed images.

Accordingly, in one or more embodiments, the visual feature extractor and nearest neighbor retrieval component 104 implements a k-NN graph with the query image 102 as the hub and the nearest neighbors (from the catalog database 106) as the spokes. Additionally, at least one embodiment includes implementing a star delta conversion that removes the query graph and translates the distances therein to NN. In accordance with one or more embodiments, in graph theory, the star delta transform refers to replacing a star sub-graph of a graph with the equivalent delta sub-graph. The transform preserves the number of edges in a graph but not the number of vertices or the number of cycles. Two graphs are said to be star-delta equivalent if one graph can be obtained from the other graph by a series of star-delta transforms in either direction.

Additionally, an embodiment such as described above can also include modeling the metadata as signals and signal quadratic variations to determine and/or identify one or more smooth sub-graphs. The smooth sub-graphs for different metadata attributes can then be combined to form a union of results and/or a multiplication of adjacency matrices.

As detailed herein, one or more embodiments include using (pre-trained) image models to extract visual features and set-up a retrieval engine. Upon receiving an image query, such an embodiment includes retrieving relevant results from a database (such as catalog database 106, for example), and from those retrieved results, determining and/or identifying one or more smooth subsets of images for each of one or more metadata attributes associated with the query image. Such an embodiment further includes searching and/or analyzing textual descriptions of the identified smooth sub-sets of images. For example, if a majority of the retrieved images, after smoothening for the query, includes a description of "blue shirt" and "navy pants," then these phrases represent the corresponding text tags for those images. Accordingly, the results of the textual description analysis are used to explicitly tag the query image. In one or more embodiments, such tagging can be carried out over multiple regions and/or bounding boxes of the query image (for example, top region: blue shirt; bottom region: navy pants).

At least one embodiment can also include providing the results of the textual description analysis as textual suggestions and/or aids in navigation with respect to the query. Further, the textual description analysis can also be performed over style rules to provide one or more style suggestions. As used herein, style rules refer to textual descriptions providing guidelines on how to wear a given product, and such rules optionally form a part of the metadata of the product. Additionally, at least one embodiment includes re-training the image model (such as, for example, the visual feature extractor and nearest neighbor retrieval component 104). Specifically, models using text description similarity as one metric to learn can be updated based at least in part on the results of the textual description analysis, such that retrieved images are closer in terms of descriptions.

Figure 2:
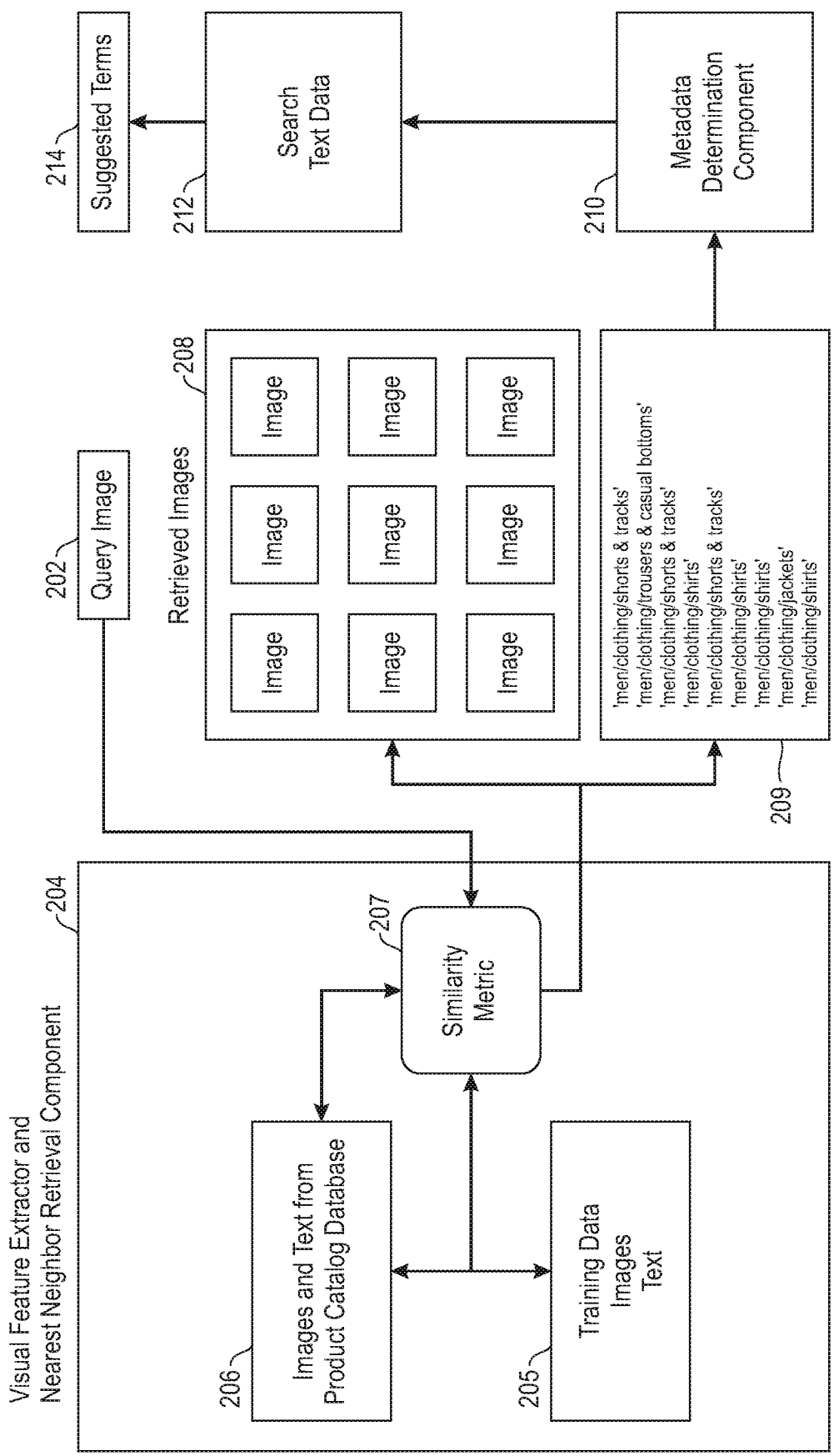
FIG. 2 is a diagram illustrating system architecture, according to an exemplary embodiment of the invention.

FIG. 2 is a diagram illustrating system architecture, according to an exemplary embodiment of the invention. By way of illustration, FIG. 2 depicts a query image 202 provided to visual feature extractor and nearest neighbor retrieval component 204. Specifically, within the visual feature extractor and nearest neighbor retrieval component 204, the query image is processed by similarity metric 207, which utilizes data from product catalog 206 (which includes images and related text) and training data 205 (which also includes images and related text) to carry out such processing. In one or more embodiments, the similarity metric 207 computes the similarity between the query image and all of the products in the catalog 206 to determine the nearest neighbors.

Based at least in part on this processing, the visual feature extractor and nearest neighbor retrieval component 204 retrieves images 208 and text descriptions 209 corresponding thereto. The text descriptions 209 are then processed by metadata determination component 210, which generates search text data 212 and, ultimately, one or more suggested terms to be used in connection with the query. In one or more embodiments, the meta-data determination component 210 works on a given set of images 208 along with their metadata 209 to determine the representative metadata attribute value for a given set of attributes. Depending on the attribute type, an example embodiment includes computing the representative metadata by performing majority voting and/or performing one or more statistical operations on the attribute values for the set of images.

Accordingly, one or more embodiments include efficient discovery of metadata, from a catalog of products, for a query image. In such an embodiment, the catalog of products includes images of products and metadata associated with those images. As detailed herein, at least one embodiment includes implementing an offline method to extract features from the catalog images using a deep learning visual model (e.g., a pre-trained model). Such an embodiment also includes implementing an offline method to extract features (e.g., such as fc6) from layers in the deep learning network/model, as well as an offline method to build efficient nearest neighbor indices on the catalog images using the extracted features.

At least one embodiment additionally includes implementing an online method to extract one or more features for a query image using the deep learning visual model (i.e., the same model used to extract features from the catalog images) and use the generated nearest neighbor indices to retrieve a set of similar catalog images. Such an embodiment further includes implementing an online method to find smooth subsets of the retrieved catalog images. Such a method uses metadata attributes of the retrieved images and the nearest neighbor distances between the retrieved images and the query image to determine and/or identify one or more of the retrieved images that have low variation in metadata values. Also, one or more embodiments include implementing an online method to efficiently search and/or analyze the metadata of the smooth subsets to discover metadata to be used in connection with the query image. Such embodiments as detailed above can also be applied to and/or implemented in connection with sub-images of the query image and/or sub-images of the catalog images.

As noted herein, one or more embodiments include identifying and/or generating smooth sub-graphs. Such an embodiment includes obtaining retrieved k-NN results for a query and, based at least in part thereon, generating a star graph wherein the query is the hub and the results are the spokes. The distance of the edges of the graph can represent a metric used for a nearest neighbor search, and each spoke node has metadata associated therewith. By way of example, for a visual search on a retail clothing catalog, metadata can include color, pattern, price, etc. associated with each catalog item (which are returned in the result set). Additionally, such an embodiment can include measuring smoothness as a quadratic variation in the graph using the Laplacian of the graph, and determining and/or identifying one or more smooth sub-sets based at least in part on such measurements. Also, one or more embodiments can include determining and/or identifying the one or more smooth sub-sets subsequent to removing one or more outliers from the retrieved results. In such an embodiment, after the star graph is created, the singleton nodes which are not connected to any of the components in the graph are determined to be outliers.

Embodiments such as detailed herein improve the performance of conventional retrieval systems, for example, by using weakly-labeled data. For example, the model(s) implemented in such embodiments can be trained and/or learned on large well-known datasets, extracted features can be used to retrieve nearest neighbor results, and such retrieved results can be smoothed to determine accurate and/or relevant subsets of images to be highlighted in response to the query image. Additionally, one or more embodiments include less pre-processing on data than conventional approaches (e.g., pose estimation for fashion images). Further, such embodiments include facilitating navigation of visual searches more efficiently than conventional approaches by associating and exposing suggested text terms. For example, such an embodiment enables querying by image, clustering the textual descriptions of retrieved images (in response to the query), and providing representative text of the clusters as suggested terms for advancing the initial query.

Figure 3:
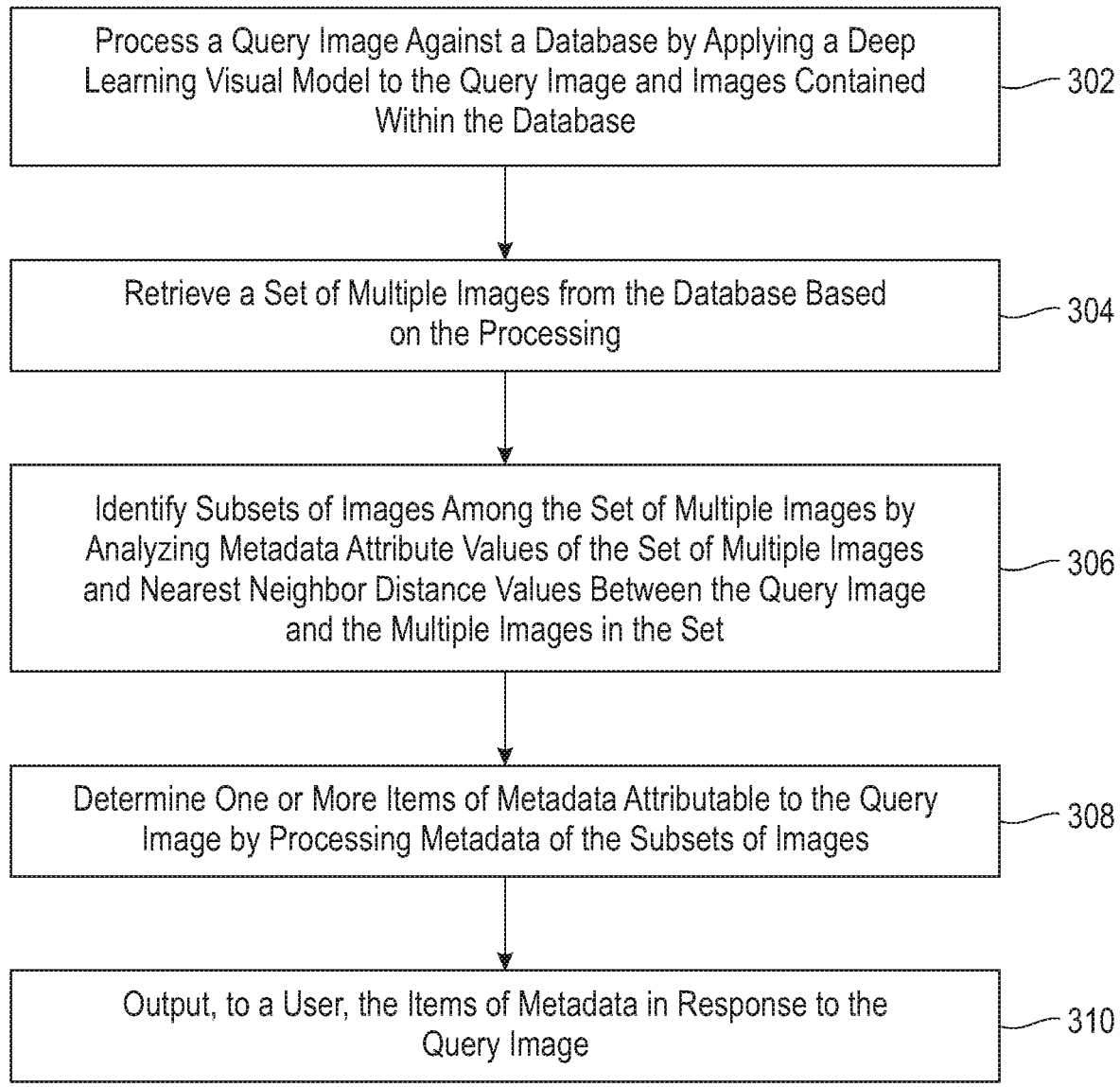
FIG. 3 is a flow diagram illustrating techniques according to an embodiment of the invention.

FIG. 3 is a flow diagram illustrating techniques according to an embodiment of the present invention. Step 302 includes processing a query image against one or more databases by applying a deep learning visual model to (i) the query image and (ii) images contained within the one or more databases. The one or more databases can include, for example, one or more product catalogs comprising images and metadata associated therewith. Step 304 includes retrieving a set of multiple images from the one or more databases based at least in part on the processing.

Processing the query image can include extracting one or more features from each of the query image and the images contained within the one or more databases. Additionally, at least one embodiment includes generating one or more nearest neighbor indices on the images contained within the one or more databases using the extracted features from the images contained within the one or more databases. In such an embodiment, retrieving is based at least in part on implementation of the one or more nearest neighbor indices.

Step 306 includes identifying one or more subsets of images among the set of multiple images by analyzing (i) one or more metadata attribute values of the set of multiple images and (ii) nearest neighbor distance values between the query image and the multiple images in the set. Identifying the one or more subsets of images can include identifying one or more subsets of images within a given nearest neighbor distance value range that have variation in metadata values, as compared to the query image, below a predetermined threshold.

Step 308 includes determining one or more items of metadata attributable to the query image by processing metadata of the one or more subsets of images. Step 310 includes outputting, to at least one user, the one or more items of metadata in response to the query image.

The techniques depicted in FIG. 3 can also include generating one or more suggested search terms based at least in part on the one or more items of metadata attributable to the query image, and outputting the one or more suggested search terms to the at least one user.

Also, an additional embodiment of the invention includes processing multiple portions of a query image against one or more databases by applying a deep learning visual model to (i) the multiple portions of the query image and (ii) multiple portions of images contained within the one or more databases. Such an embodiment also includes retrieving a set of multiple images from the one or more databases based at least in part on said processing, and identifying, for each of the multiple portions of the query image, one or more subsets of images among the set of multiple images by analyzing (i) one or more metadata attribute values of the multiple portions of the set of multiple images and (ii) nearest neighbor distance values between the given portion of the query image and the multiple portions of the multiple images in the set. Additionally, such an embodiment includes generating a final subset of images by (i) removing one or more outlier subsets from the identified subsets and (ii) combining the remaining subsets into the final subset of images, determining one or more items of metadata attributable to the query image by processing metadata of the images within the final subset, and outputting, to at least one user, the one or more items of metadata in response to the query image.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
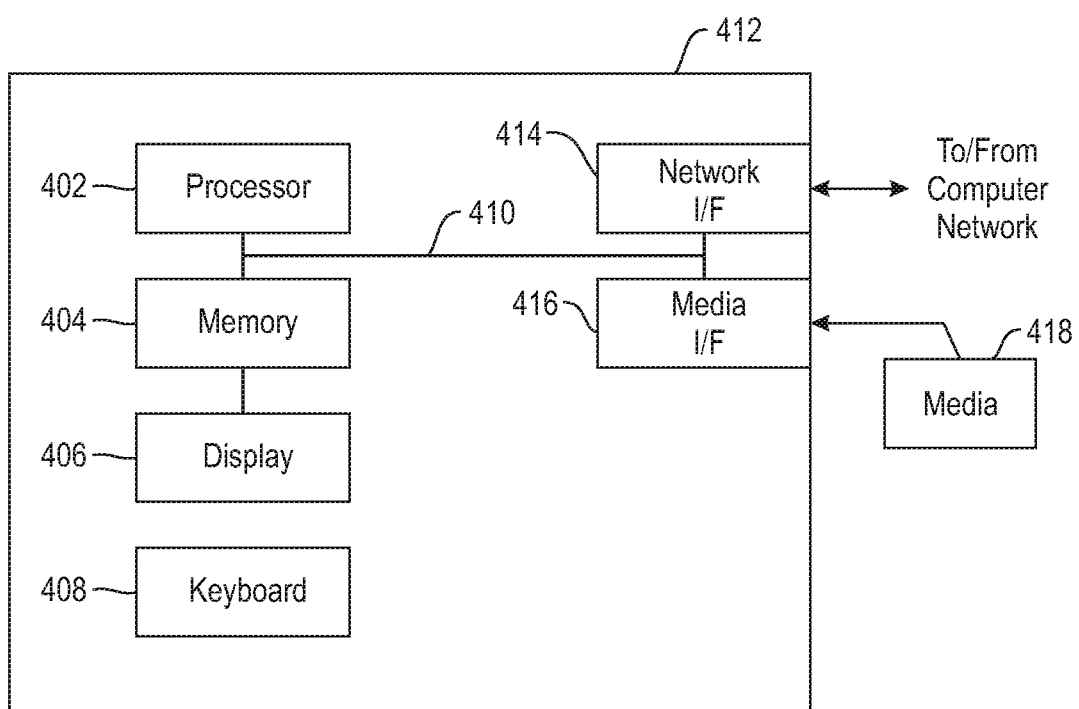
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
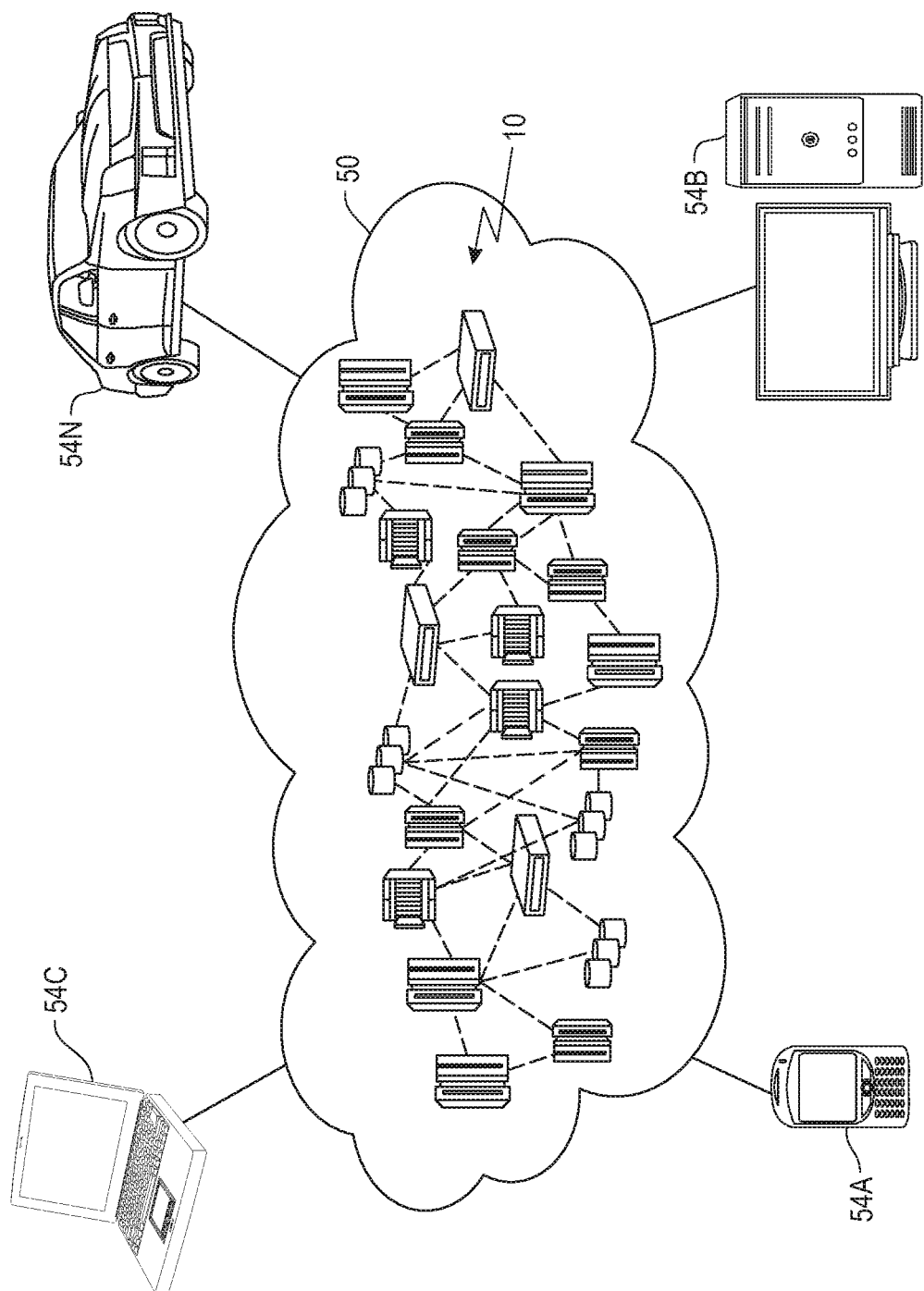
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
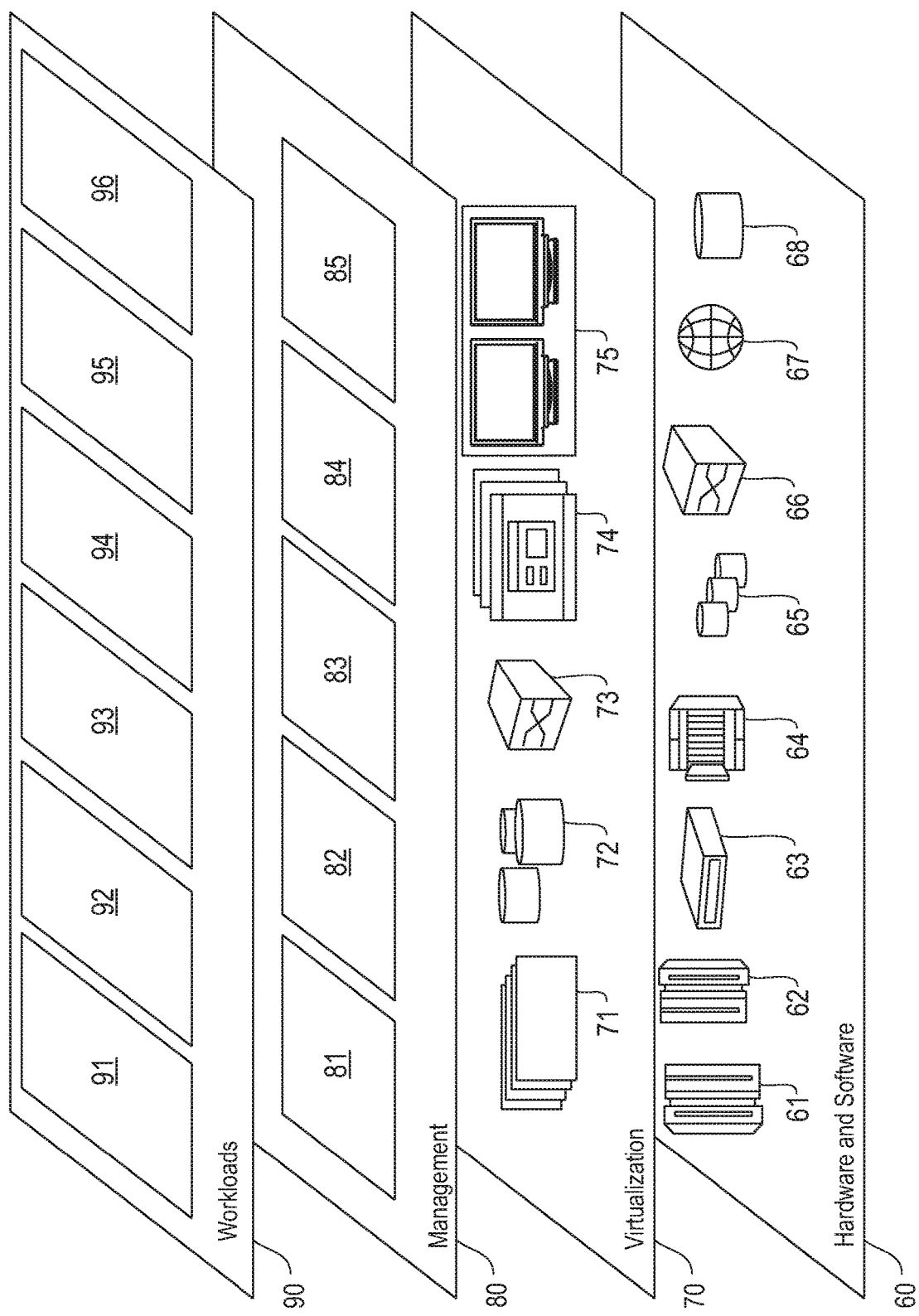
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and visual query metadata determination 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, determining smooth subsets of a retrieved dataset and utilizing metadata attributes of retrieved images for identifying set of images having low variation in metadata values.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising steps of:

processing a query image against one or more databases by applying a deep learning visual model to (i) the query image and (ii) images contained within the one or more databases; retrieving a set of multiple images from the one or more databases based at least in part on said processing;

generating a star graph comprising: (i) a hub component corresponding to the query image; (ii) a set of spoke components corresponding to the retrieved set of multiple images; and (iii) a set of edges connecting the hub component to the set of spoke components, wherein a given edge in the set of edges represents a nearest neighbor distance value between the query image and an image in the retrieved set of multiple images corresponding to the given edge;

identifying one or more subsets of images among the set of multiple images by analyzing (i) one or more metadata attribute values of the set of multiple images and (ii) at least a portion of the nearest neighbor distance values of the star graph;

determining one or more items of metadata attributable to the query image by processing metadata of the one or more subsets of images; and outputting, to at least one user, the one or more items of metadata in response to the query image;

wherein the steps are carried out by at least one computing device.

2. The computer-implemented method of claim 1, wherein said processing the query image comprises extracting one or more features from each of the query image and the images contained within the one or more databases.

3. The computer-implemented method of claim 2, comprising:

generating one or more nearest neighbor indices on the images contained within the one or more databases, using the extracted features from the images contained within the one or more databases.

4. The computer-implemented method of claim 3, wherein said retrieving is based at least in part on implementation of the one or more nearest neighbor indices.

5. The computer-implemented method of claim 1, wherein the one or more databases comprise one or more product catalogs comprising images and metadata associated therewith.

6. The computer-implemented method of claim 1, wherein said identifying the one or more subsets of images comprises identifying one or more subsets of images within a given nearest neighbor distance value range that have variation in metadata values, as compared to the query image, below a predetermined threshold.

7. The computer-implemented method of claim 1, comprising:

generating one or more suggested search terms based at least in part on the one or more items of metadata attributable to the query image.

8. The computer-implemented method of claim 7, comprising:

outputting the one or more suggested search terms to the at least one user.

9. A computer program product comprising a non-transitory computer readable storage medium having program instructions embodied therewith, the program instructions executable by a computing device to cause the computing device to:

process a query image against one or more databases by applying a deep learning visual model to (i) the query image and (ii) images contained within the one or more databases;

retrieve a set of multiple images from the one or more databases based at least in part on said processing;

generate a star graph comprising: (i) a hub component corresponding to the query image; (ii) a set of spoke components corresponding to the retrieved set of multiple images; and (iii) a set of edges connecting the hub component to the set of spoke components, wherein a given edge in the set of edges represents a nearest neighbor distance value between the query image and an image in the retrieved set of multiple images corresponding to the given edge;

identify one or more subsets of images among the set of multiple images by analyzing (i) one or more metadata attribute values of the set of multiple images and (ii) at least a portion of the nearest neighbor distance values of the star graph;

determine one or more items of metadata attributable to the query image by processing metadata of the one or more subsets of images; and output, to at least one user, the one or more items of metadata in response to the query image.

10. The computer program product of claim 9, wherein said processing the query image comprises extracting one or more features from each of the query image and the images contained within the one or more databases.

11. The computer program product of claim 10, wherein the program instructions executable by a computing device further cause the computing device to:

generate one or more nearest neighbor indices on the images contained within the one or more databases, using the extracted features from the images contained within the one or more databases.

12. The computer program product of claim 11, wherein said retrieving is based at least in part on implementation of the one or more nearest neighbor indices.

13. The computer program product of claim 9, wherein the one or more databases comprise one or more product catalogs comprising images and metadata associated therewith.

14. The computer program product of claim 9, wherein said identifying the one or more subsets of images comprises identifying one or more subsets of images within a given nearest neighbor distance value range that have variation in metadata values, as compared to the query image, below a predetermined threshold.

15. The computer program product of claim 9, wherein the program instructions executable by a computing device further cause the computing device to:

generate one or more suggested search terms based at least in part on the one or more items of metadata attributable to the query image.

16. The computer program product of claim 15, wherein the program instructions executable by a computing device further cause the computing device to:

output the one or more suggested search terms to the at least one user.

17. A system comprising:

a memory; and at least one processor operably coupled to the memory and configured for:

processing a query image against one or more databases by applying a deep learning visual model to (i) the query image and (ii) images contained within the one or more databases;

retrieving a set of multiple images from the one or more databases based at least in part on said processing;

generating a star graph comprising: (i) a hub component corresponding to the query image; (ii) a set of spoke components corresponding to the retrieved set of multiple images; and (iii) a set of edges connecting the hub component to the set of spoke components, wherein a given edge in the set of edges represents a nearest neighbor distance value between the query image and an image in the retrieved set of multiple images corresponding to the given edge;

identifying one or more subsets of images among the set of multiple images by analyzing (i) one or more metadata attribute values of the set of multiple images and (ii) at least a portion of the nearest neighbor distance values of the star graph;

determining one or more items of metadata attributable to the query image by processing metadata of the one or more subsets of images; and outputting, to at least one user, the one or more items of metadata in response to the query image.

18. A computer-implemented method, the method comprising steps of:

processing multiple portions of a query image against one or more databases by applying a deep learning visual model to (i) the multiple portions of the query image and (ii) multiple portions of images contained within the one or more databases;

retrieving a set of multiple images from the one or more databases based at least in part on said processing;

generating a star graph for each of the multiple portions of the query image, the star graph comprising: (i) a hub component corresponding to a given portion of the query image;

(ii) a set of spoke components corresponding to multiple portions of the multiple images in the set; and (iii) a set of edges connecting the hub component to the set of spoke components, wherein a given edge in the set of edges represents a nearest neighbor distance value between the given portion of the query image and a portion of an image in the set of multiple images corresponding to the given edge;

identifying, for each of the multiple portions of the query image, one or more subsets of images among the set of multiple images by analyzing (i) one or more metadata attribute values of the multiple portions of the set of multiple images and (ii) at least a portion of the nearest neighbor distance values of the star graph;

generating a final subset of images by (i) removing one or more outlier subsets from the identified subsets and (ii) combining the remaining subsets into the final subset of images;

determining one or more items of metadata attributable to the query image by processing metadata of the images within the final subset; and outputting, to at least one user, the one or more items of metadata in response to the query image;

wherein the steps are carried out by at least one computing device.

19. The computer-implemented method of claim 18, comprising:

generating one or more suggested search terms based at least in part on the one or more items of metadata attributable to the query image.

20. The computer-implemented method of claim 19, comprising:

outputting the one or more suggested search terms to the at least one user.

* * * * *